US011045943B2

(12) United States Patent
Cross et al.

(10) Patent No.: US 11,045,943 B2
(45) Date of Patent: Jun. 29, 2021

(54) LAYOUT AND MEASURING TOOL

(71) Applicant: Woodpeckers, LLC, Strongsville, OH (US)

(72) Inventors: Steven Charles Cross, Mentor, OH (US); Richard M. Hummel, Parma, OH (US)

(73) Assignee: WOODPECKERS, LLC, Strongsville, OH (US)

( * ) Notice: Subject to any disclaimer, the term of this patent is extended or adjusted under 35 U.S.C. 154(b) by 376 days.

(21) Appl. No.: 16/294,110

(22) Filed: Mar. 6, 2019

(65) Prior Publication Data
US 2020/0282548 A1   Sep. 10, 2020

(51) Int. Cl.
*G01B 3/04*   (2006.01)
*B25H 7/04*   (2006.01)
*G01B 5/00*   (2006.01)

(52) U.S. Cl.
CPC ........... *B25H 7/045* (2013.01); *G01B 3/04* (2013.01); *G01B 5/0002* (2013.01)

(58) Field of Classification Search
CPC ..................................................... B25H 7/00
USPC ..................... 33/405, 474, 475, 481, 483
See application file for complete search history.

(56) References Cited

U.S. PATENT DOCUMENTS

| | | | | |
|---|---|---|---|---|
| 2,315,004 A * | 3/1943 | Painter | ............ | G01B 3/566 33/481 |
| 3,303,569 A * | 2/1967 | Wyatt | ............ | E04G 21/1841 33/343 |
| D364,177 S | 11/1995 | Lewis | | |
| 5,729,934 A * | 3/1998 | Ochoa | ............ | E04G 21/18 33/407 |
| D399,440 S | 10/1998 | Taylor | | |
| 6,415,520 B1 * | 7/2002 | Locklear | ............ | B25H 7/00 33/476 |
| 6,918,187 B2 * | 7/2005 | Schaefer | ............ | G01C 9/26 33/365 |
| D582,305 S | 12/2008 | Coplan | | |
| D616,317 S | 5/2010 | Yeh | | |
| D616,318 S | 5/2010 | Yeh | | |
| D670,181 S | 11/2012 | Allemand | | |
| 2006/0265895 A1 * | 11/2006 | Daugherty | ............ | B43L 7/00 33/613 |
| 2008/0301962 A1 * | 12/2008 | Haala | ............ | B43L 7/12 33/415 |
| 2009/0313839 A1 * | 12/2009 | Spaulding | ............ | G01C 9/28 33/382 |
| 2010/0071221 A1 * | 3/2010 | Hsu | ............ | B43L 7/007 33/483 |
| 2013/0160313 A1 * | 6/2013 | Swanson | ............ | G01B 3/56 33/430 |
| 2015/0233131 A1 * | 8/2015 | Hofstetter | ............ | E04F 21/26 33/427 |
| 2020/0307300 A1 * | 10/2020 | Logan | ............ | B43L 7/12 |

* cited by examiner

*Primary Examiner* — George B Bennett
(74) *Attorney, Agent, or Firm* — Sand, Sebolt & Wernow Co., LPA

(57) ABSTRACT

A layout and measurement tool for measuring and marking the edge of a piece of stock may have a first arm extending from a central portion in a horizontal plane and a second arm extending from the central portion in a vertical plane allowing for simultaneous measurement and marking of the top face of the stock piece and the side of the stock piece without the need to move or reposition the tool.

20 Claims, 11 Drawing Sheets

LAYOUT AND MEASURING TOOL

TECHNICAL FIELD

The present disclosure relates generally to the field of a woodworking measurement tool. More particularly, the present disclosure relates to a layout and measuring tool for measuring wood stock. Specifically the present disclosure relates to a layout and measuring tool for measuring along the edge of the stock. The tool having a first arm and a second arm for measuring along the narrow edge of wood stock.

BACKGROUND

Background Information

In construction, particularly in woodworking and/or carpentry, measurement of stock is a vital component to insuring proper alignment and fit between various pieces of wood. The old adage "measure twice and cut once" illustrates the need for high precision in measurement as even an error of a few millimeters or less could result in a misaligned or out of square connection, thus throwing off the entire work. This is especially important in precision applications, such as fine finish woodworking, as well as in carpentry where introduced error can result in instability, such as in construction of a load-bearing wall for example. Further, even a very small degree of misalignment may result in a finished piece or a surface being out of level. At best, it may require a stock piece to be scrapped and replaced with another piece of stock, thus increasing the cost of the project.

While many measurement tools exist, these tools typically have specific applications and thus include shortcomings when used for general measurement or for applications for which they were not specifically designed. One such example is the standard woodworking ruler which usually needs to be aligned to the face of the wood stock, but is typically wider than the edge of the stock you are trying to measure. Therefore, precise alignment is often frustrated through movement of the woodworking ruler as you attempt to mark the stock. Additionally, it is common for rulers to shift during marking as the woodworker typically employs one hand to hold the ruler and the other hand to perform the marking, therefore, introducing instability into the measurement.

Other measurement tools, such as tape measures and carpenter squares, likewise are suited for particular purposes and may fall short in other applications. In particular, these tools are not particularly useful when attempting to do layout work on the narrow edge of a stock piece as they are typically difficult to properly align and hold in place while marking.

Another common shortcoming of many measurement tools being used for marking multiple faces of a piece of stock is the introduction of parallax error, which is an error introduced based on the angle at which the tool is viewed during the measurement and marking. When marking the narrow edge of a piece of stock, parallax error is very common as typical rulers are aligned to the face and the woodworker must visualize the markings running along the narrow edge and can easily unintentionally misalign the measurement along this narrow edge. This is particularly troublesome when using a tape measure as the edges of a tape measure typically curve up from the center, thus putting the measurement markings further away from the surface being marked. Attempts to solve this include angling the measurement tool which can in fact increase the likelihood of parallax error despite the appearance of reducing parallax error. Further, this introduces instability into the measurement tool as it is often difficult to hold the tool steady while angling the tool and simultaneously marking the desired position.

SUMMARY

The layout and measuring tool of the present disclosure addresses these and other issues by providing an elongated measuring tool with a first arm adapted to sit across a major face of a piece of stock material and a second arm adapted to simultaneously engage a minor face of the piece of stock material. Both arms including a tapered marking surface for easy and accurate marking therewith.

In one aspect, the present disclosure may provide a layout and measuring tool comprising: a first arm extending from a central portion in a first direction, the first arm having an inner face for engaging a first surface of a stock material and at least one outer face spaced apart from the inner face and having measurement markings thereon; a second arm extending from the central portion in a second direction, the second arm having an inner face for engaging a second surface of the stock material that is perpendicular to the first surface and at least one outer face spaced apart from the inner face and having measurement markings thereon; a first end and a second end; a length of the tool measured from the first end to the second end; an arcuate channel formed in the outer face of the first arm extending along the length of the tool from the first end to the second end; a width of the tool measured from the at least one outer surface of the second arm to a terminal end of the first arm; a height of the tool measured from the at least one outer surface of the first arm to a terminal end of the second arm; and wherein the length is greater than width and is greater than the height, and wherein the width is greater than the height.

In another aspect, the present disclosure may provide a method comprising: placing a measurement tool on an edge of a piece of stock material, the measurement tool having a first arm extending a first distance from a central portion of the measurement tool in a first direction, a second arm extending a second distance from the central portion of the measurement tool in a second direction, and a first end and a second end defining a longitudinal length of the measurement tool therebetween, and an arcuate channel formed in an outer face of the first arm extending along the length of the tool from the first end to the second end; wherein the first distance is greater than the second distance, and wherein the length of the measurement tool is greater than the first and second distances; aligning the measurement tool such that the longitudinal length of the measurement tool extends along the edge of a piece of stock material while an inner face of the first arm engages a first surface of the stock material and an inner face of the second arm simultaneously engages a second surface of the stock material that is perpendicular from the first surface of the stock material; measuring and marking a first distance along the longitudinal length of the measurement tool on the first surface of the stock material; and measuring and marking a second distance along the longitudinal length of the measurement tool on the second surface of the stock material without moving the measuring tool.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figures 1A, 1B:
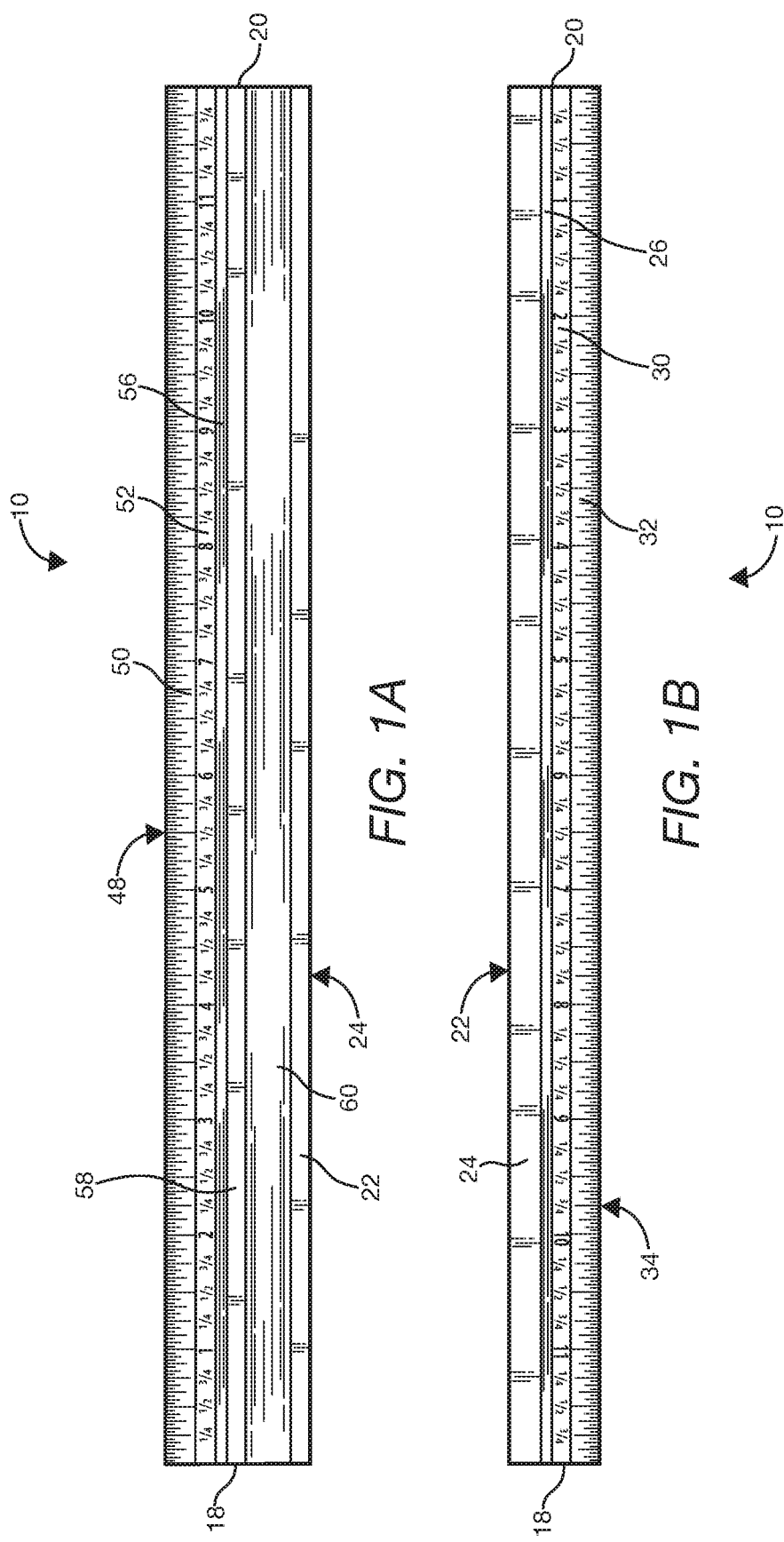
FIG. 1A is an overhead plan view of a layout and measurement tool according to one aspect of the present disclosure.
FIG. 1B is a rear elevation view of a layout and measurement tool according to one aspect of the present disclosure.
Figure 2:
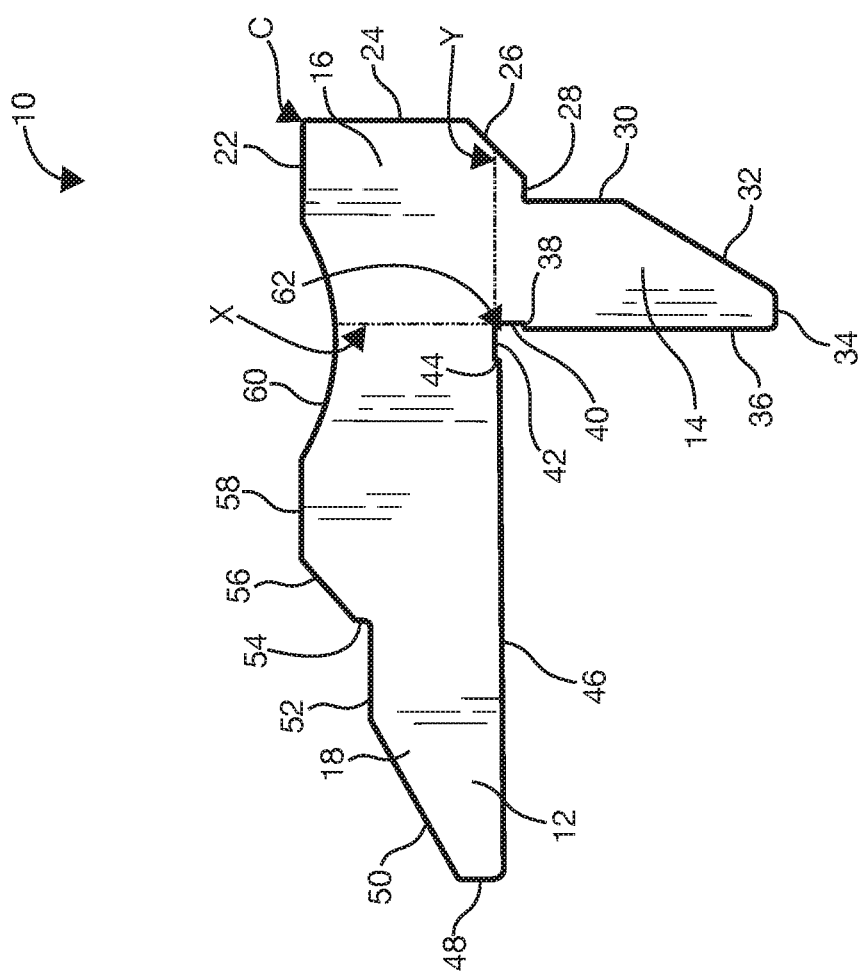
FIG. 2 is a left side elevation view of a layout and measurement tool according to one aspect of the present disclosure. The right side of the layout and measurement tool being a mirror image thereof.

With reference to FIGS. 1A-B and 2, a layout and measuring tool 10 hereinafter referred to as tool 10 is shown having a first arm 12, a second arm 14, a central portion 16, a first end 18, and a second end 20.

Figure 5:
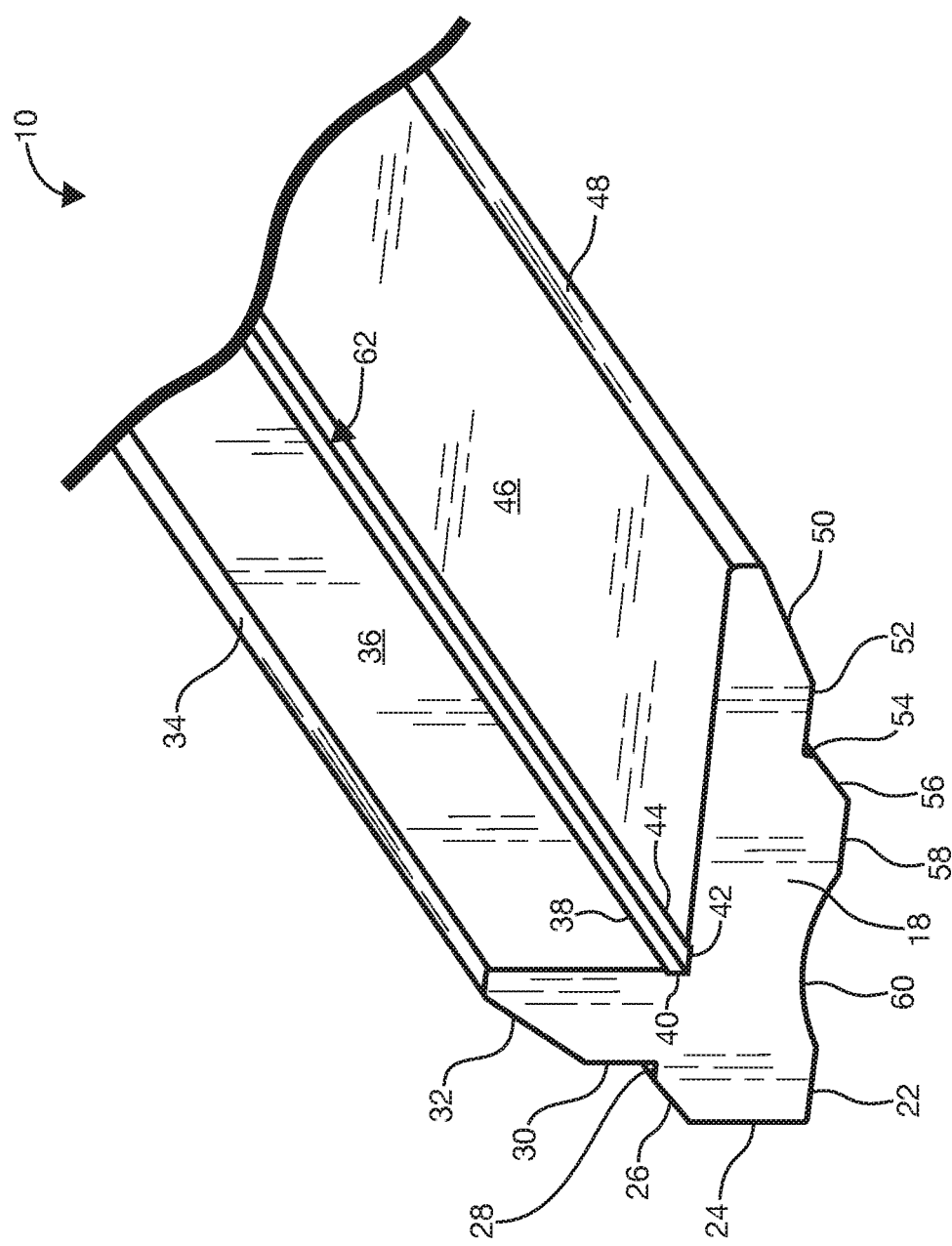
FIG. 5 is bottom left front perspective view of a layout and measurement tool according to one aspect of the present disclosure.

For the purposes of clarity and brevity, tool 10 will be discussed herein as having the orientation as shown in FIG. 2 such that first arm 12 extends horizontally forward from central portion 16 while second arm 14 extends vertically downward from central portion 16. The relationship of first arm 12 to second arm 14 further defines angle A, which is discussed more thoroughly herein; however, for purposes of this disclosure, angle A is the angle between first arm 12 and second arm 14 and the vertex thereof may be used as a reference point for the various surfaces and faces of tool 10. Specifically, the vertex of angle A may be considered an inner point of tool 10 such that directional terms used herein are relative to this point. For example, if a surface is described as inner, or as extending inward, it is to be understood as being towards the vertex of angle A (or towards a plane extending therefrom), while a surface described as outer, or extending outward, will be understood as being away from the vertex of angle A. Similarly, the vertex of angle A may be used as a reference for surfaces described as rear (to the right of the vertex when tool is oriented as shown in FIG. 2—generally relating to second arm 14), front (to the left of the vertex when oriented as shown in FIG. 2—generally relating to first arm 12), top (above the vertex when oriented as shown in FIG. 2), and/or bottom (below the vertex when oriented as shown in FIG. 2). It will be readily recognized that tool 10 may be rotated or moved to other orientations and positions (as is shown in various figures herein) wherein the various surfaces described herein may be positioned such that the nomenclature used herein does not coincide with the actual position thereof. Accordingly, these terms are used relative to the vertex of angle A and/or to a plane extending therefrom, and should be applied accordingly. For example, first horizontal top surface 22 may face upwards when tool 10 is oriented as shown in FIG. 2, but may face downwards if tool 10 were oriented in an inverted position (such as in FIG. 5) or may face sideways when tool 10 is rotated into a vertical position (such as in FIGS. 8 and 9). First horizontal top surface 22, however, will always be in the same position relative to the vertex of angle A and is therefore to be understood to refer to the indicated surface regardless of orientation of tool 10.

Furthermore, the body of tool 10 may be a unibody that is integrally extruded, molded, or formed as a unitary, monolithic member substantially fabricated from a rigid, manmade, material. In one example, metal or metal alloys, such as stainless steel or aluminum alloy, may form a substantial majority of the components or elements used to fabricate the body of tool 10 and the various components integrally formed, molded, or extruded therewith. The rigid body of tool 10 should withstand typical woodworking handling from an operator pressing the body of tool 10 against a piece of stock material to be marked and then cut without damaging the body of tool 10. While it is contemplated that the body of tool 10 and its additional components described herein are uniformly and integrally extruded, molded, or formed, it is entirely possible that the components of the body of tool 10 be formed separately from alternative materials as one having routine skill in the art would understand. In another example, the body of tool 10 may be formed from an elastomeric material or rubber material configured to withstand deformation upon impact or bending by the operator (i.e., a woodworker). Furthermore, while the components of tool 10 are discussed below individually, it is to be clearly understood that the components and their corresponding reference elements of tool 10 are portions, regions, or surfaces of the body and all form a respective element or component of the unitary tool body. Thus, while the components may be discussed individually and identified relative to other elements or components of the body of tool 10, in this exemplary embodiment, there is a single tool body having the below described portions, regions, and/or surfaces.

Accordingly, with reference to FIGS. 1A, 1B and 2-5, the various surfaces and faces of tool 10 will now be named and described. Tool 10 may have a first end 18 spaced apart from second end 20 defining therebetween the longitudinal length L of tool 10. The various relative dimensions of tool 10, including length L, will be discussed further herein. All surfaces discussed below may extend between first and second ends 18, 20 such that each surface extends across the longitudinal length L of tool 10.

With continued reference to FIGS. 1A, 1B and 2-5, but with particular reference to FIG. 2, tool 10 may further include a first horizontal top surface 22 that is positioned towards the rear of tool 10 when oriented as shown, and defines a face of central portion 16. First horizontal top surface 22 may further define the uppermost and rearward most surface when tool 10 is oriented as shown.

Moving clockwise around tool 10, as oriented in FIG. 2, from first horizontal top surface 22, the next surface shown is first vertical rear surface 24. It will be understood that the surfaces of tool 10 discussed herein will each have a first and second end, and that the first end of each individual surface will be recognized as the end connecting to the surface immediately preceding and the second end of each surface will be recognized as the end connecting to the surface immediately following. For example, the first end of first vertical rear surface 24 may be the uppermost end thereof, where it intersects with the rearward most end of first horizontal top surface 22, forming the corner indicted as corner C in FIG. 2. Second end of first vertical rear surface 24 will then be logically recognized as the end where it meets first angled rear surface 26, discussed below. According to one aspect, first vertical rear surface 24 may be parallel to first vertical inner surface 36 (discussed below).

Corner C may further represent the uppermost and rearward most point of tool 10 (when viewed with the orientation as shown in FIG. 2) and may be positioned at an angle relative to the first vertical inner surface 36 and third horizontal inner surface 46 (each of which will be discussed more fully below) such that an imaginary line drawn through central portion 16 of tool 10 from corner C to the vertex of angle A may be angled at approximately 135° relative to these inner surfaces. According to another aspect, corner C may be approximately 135.5° from each inner surface.

First angled rear surface 26 may then extend downward from first vertical rear surface 24 and inward therefrom. First angled rear surface 26 may be oriented at any angle relative to first vertical inner surface 36. According to one aspect, first angled rear surface 26 may have an angle of approximately 45° relative to first vertical inner surface 36.

Tool 10 may then have a horizontal rear surface 28 extending inward from first angled rear surface 26 and may connect first angled rear surface 26 with second vertical rear surface 30 which extends downward from horizontal rear surface 28. According to one aspect, horizontal rear surface 28 may be parallel to third horizontal inner surface 46 (discussed below). According to another aspect, second vertical rear surface 30 may be parallel to first vertical inner surface 36.

Next, a second angled rear surface 32 may extend further downward and inward from second vertical rear surface 30 and may terminate at horizontal bottom surface 34. Second angled rear surface 32 may be oriented at any angle relative to first vertical inner surface 36. According to one aspect, second angled rear surface 32 may be angled less than 45° relative to first vertical inner surface 36. According to another aspect, second angled rear surface 32 may have an angle of approximately 30°. According to another aspect, second angled rear surface 32 may have an angle relative to first vertical inner surface 36 that is less than the angle of first angled rear surface 26 relative to first vertical inner surface 36.

Horizontal bottom surface 34 may define the bottom most point on tool 10 (when viewed with the orientation as shown in FIG. 2) and may be the surface of second arm 14 that is furthest from central portion 16, as discussed further herein. According to one aspect, horizontal bottom surface 34 may be parallel to third horizontal inner surface 46.

Extending perpendicular and vertically from horizontal bottom surface 34 may be first vertical inner surface 36 which is the surface of second arm 14 that may engage a face of a piece of stock material 64, as discussed below.

First vertical inner surface 36 may extend to a first horizontal inner surface 38 and a second vertical inner surface 40. Second vertical inner surface 40 may terminate at the vertex of angle A. Second horizontal inner surface 42 may then extend from second vertical inner surface 40 to third vertical inner surface 44. First horizontal inner surface 38, second vertical inner surface 40, second horizontal inner surface 42, and third vertical inner surface 44 may collectively form a longitudinal groove 62 (best seen in FIG. 5) that extends from first end 18 to second end 20 of tool 10 as discussed further herein.

Continuing clockwise around tool 10, next may be third horizontal inner surface 46 which is the surface of first arm 12 that may engage a face of a piece of stock, as discussed below. Third horizontal inner surface 46 may extend from third vertical inner surface 44 to a vertical front surface 48 which may further define the forward most point of tool 10 and the furthest face of first arm 12 from central portion 16, as discussed further herein. Vertical front surface 48 may be perpendicular to third horizontal inner surface 46 and may extend vertically therefrom. According to one aspect, vertical front surface 48 may also be parallel to first vertical inner surface 36.

Extending rearward therefrom may be first angled top surface 50 which may be oriented at any angle relative to third horizontal inner surface 46. According to one aspect, first angled top surface 50 may be angled less than 45° relative to third horizontal inner surface 46. According to another aspect, first angled top surface 50 may have an angle of approximately 30°. According to another aspect, the angle between first angled top surface 50 and third horizontal inner surface 46 may be less than the angle between third horizontal inner surface 46 and second angled top surface 56, discussed below.

Extending rearward from first angled top surface 50 may be second horizontal top surface 52 which may terminate at a vertical top surface 54. According to one aspect, second horizontal top surface 52 may be parallel to third horizontal inner surface 46. According to another aspect, vertical top surface 54 may be parallel to first vertical inner surface 36.

Vertical top surface 54 may then connect to second angled top surface 56, which may be angled relative third horizontal inner surface 46 at any angle. According to one aspect, second angled top surface 56 may have an angle of approximately 45° relative to third horizontal inner surface 46.

Third horizontal top surface 58 may extend rearward from second angled top surface 56 and may then be separated from first horizontal top surface 22 by an arcuate channel, hereinafter referred to as curved recess 60. Third horizontal top surface 58 and first horizontal top surface 22 may share the same plane and may be parallel to third horizontal inner surface 46.

First horizontal top surface 22, first vertical rear surface 24, first angled rear surface 26, horizontal rear surface 28, second vertical rear surface 30, second angled rear surface 32, horizontal bottom surface 34, vertical front surface 48, first angled top surface 50, second horizontal top surface 52, vertical top surface 54, second angled top surface 56, third horizontal top surface 58, and curved recess 60 may all be considered outer faces that may be spaced apart from one or more of inner surfaces 36, 38, 40, 42, 44, and/or 46.

Having thus defined the various surfaces and faces of tool 10, the configuration and relative dimensions thereof will now be further discussed. Tool 10 may have a longitudinal length L, defined as the distance between first end 18 and second end 20. As tool 10 is a measurement tool, the specific length L needs to be precise, but may vary in actual length. For example, tool 10 may be a standard measurement tool and may have any specific length L, but may be precisely 6 inches, 12 inches, 24 inches, 36 inches, or any other standard increment. Tool 10 may likewise be a metric measuring tool and may have any specific length L, but may be precisely 150 millimeters, 300 millimeters, 600 millimeters, 900 millimeters, or any other metric increment. As discussed herein, tool 10 may have any standard or metric length L as the specific length L does not limit the configuration or use thereof.

Tool 10 may further have an overall width W1, which may be defined as the distance from first vertical rear surface 24 to vertical front surface 48, and an overall height H1, defined as the distance from first horizontal top surface 22 to horizontal bottom surface 34. The overall width W1 of tool 10 may be greater than the overall height H1 of tool 10. According to one aspect, the overall width W1 may have a ratio of approximately 2:1 relative to overall height H1. According to another aspect, the overall width to height ratio may be approximately 1.5:1.

Figure 3:
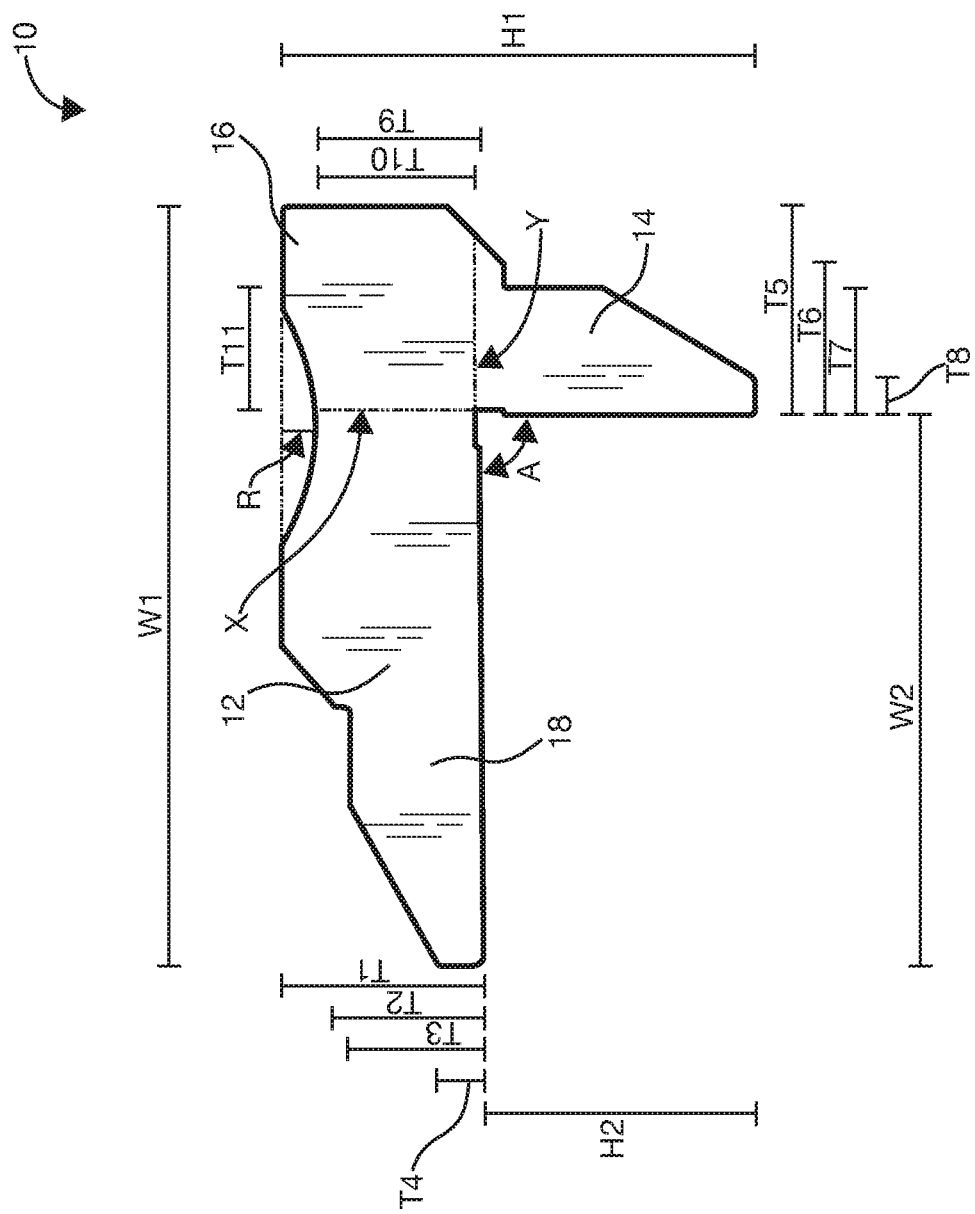
FIG. 3 is a left side elevation view of a layout and measurement tool showing the dimensional relationships of the components thereof.
Figure 4:
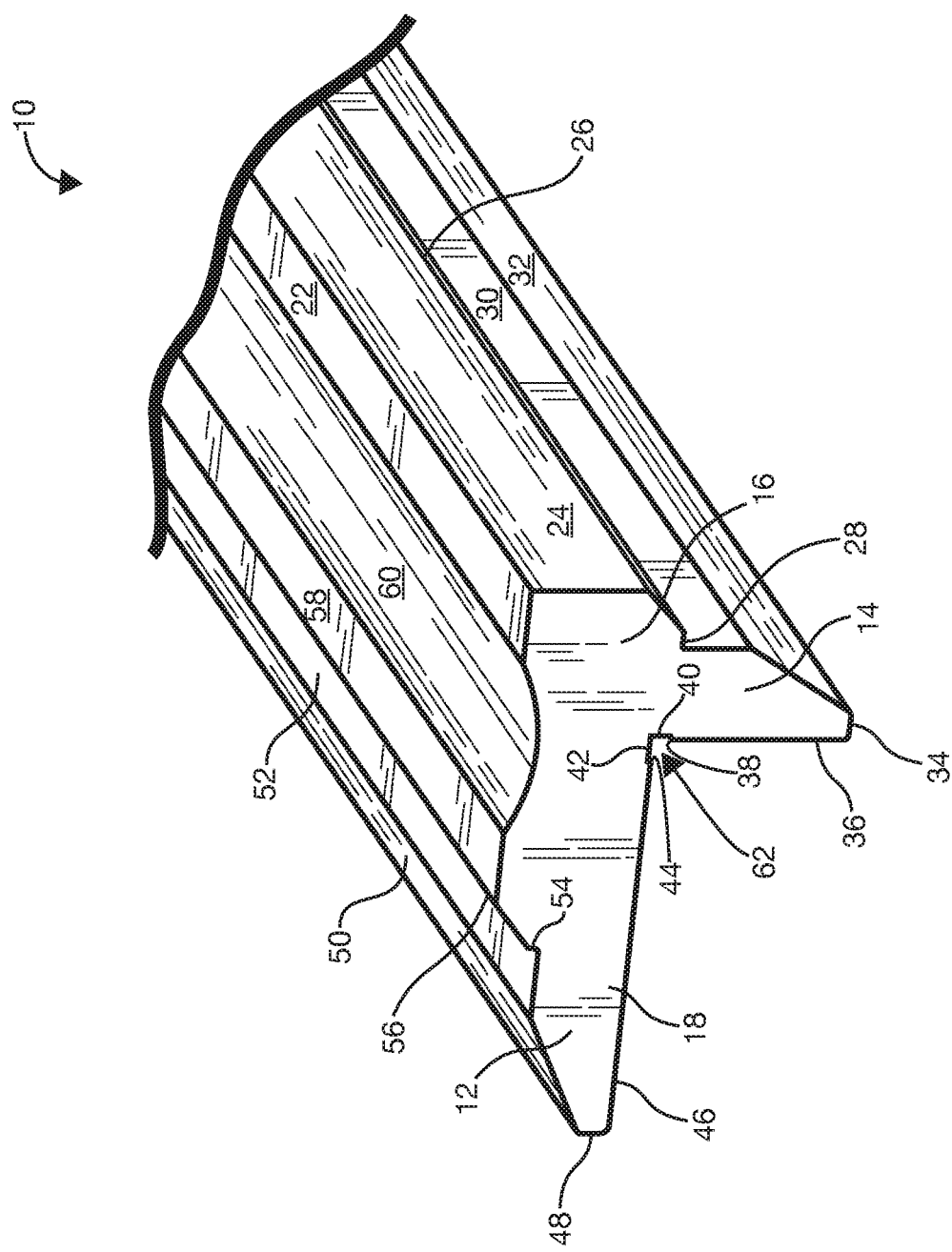
FIG. 4 is a top left rear perspective view of a layout and measurement tool according to one aspect of the present disclosure.

With reference to FIGS. 2 and 3, dimensions of tool 10 may be further illustrated with reference to its three main components, namely, first arm 12, second arm 14, and central portion 16, and to the relative dimensions thereof.

Figure 8:
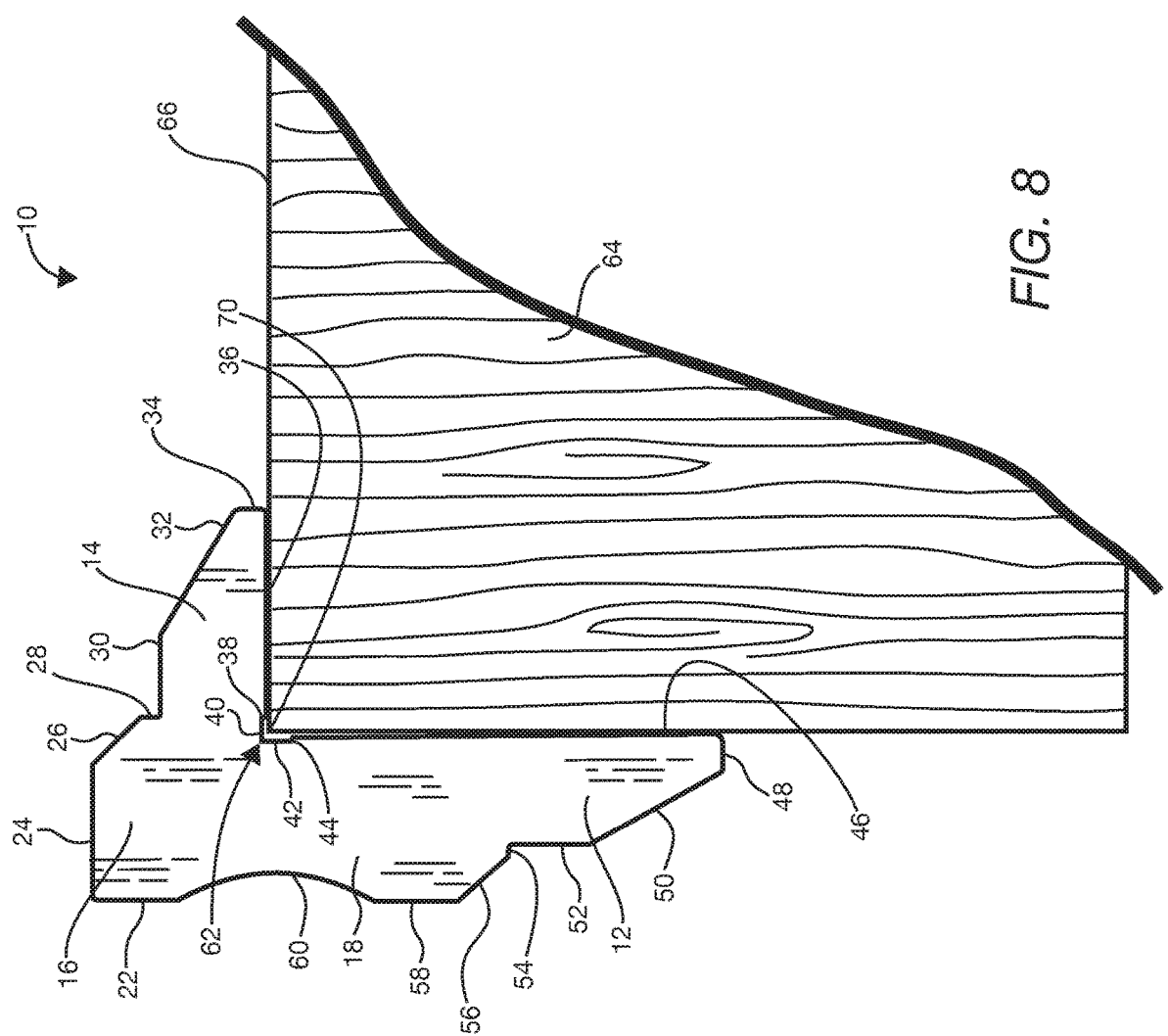
FIG. 8 is a left side elevation and operational view of a layout and measurement tool in a second orientation according to one aspect of the present disclosure.
Figure 9:
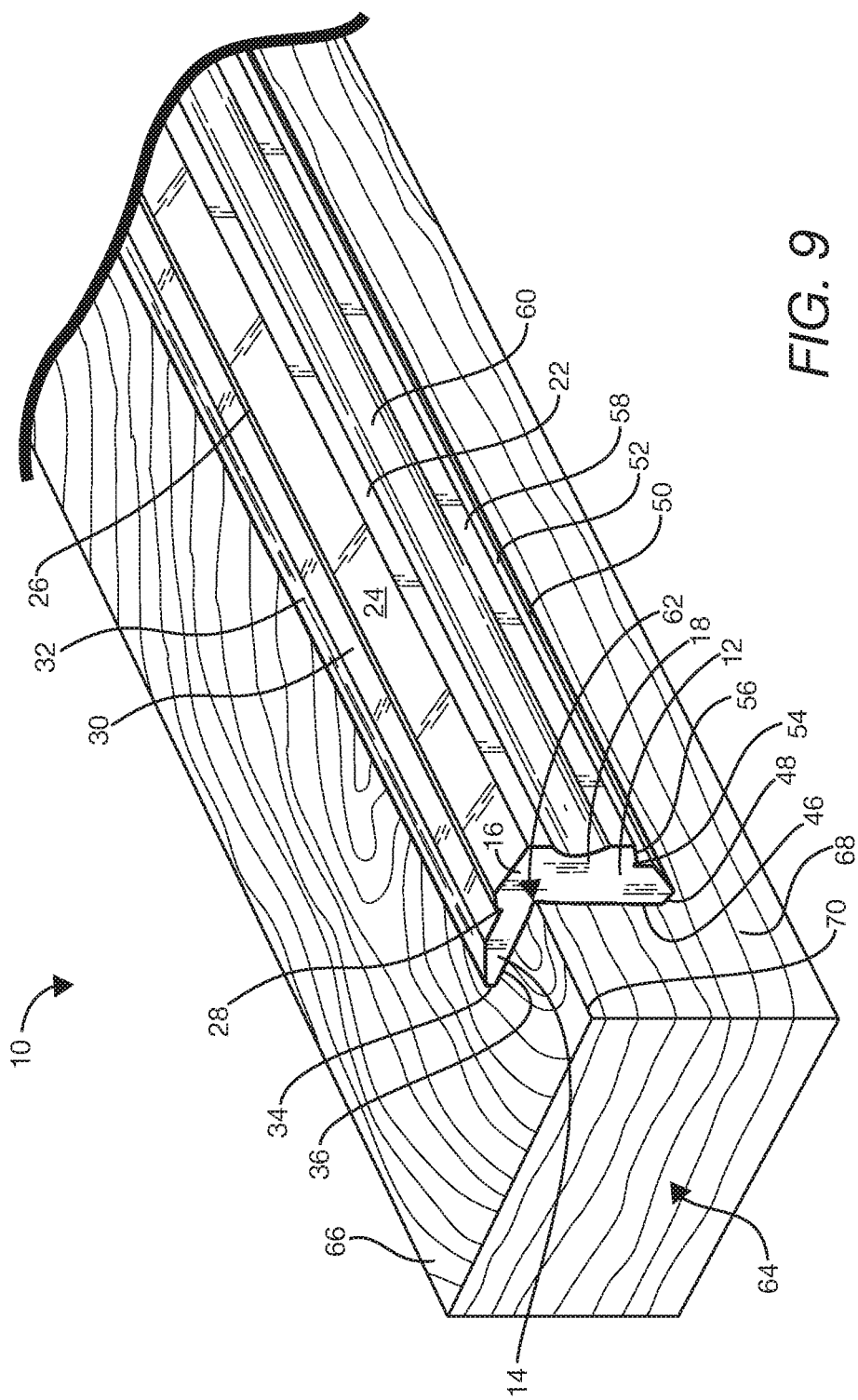
FIG. 9 is a top left rear perspective operational view of a layout and measurement tool in a second orientation according to one aspect of the present disclosure.

As discussed above and as best illustrated in FIG. 3, first arm 12 may extend horizontally from central portion 16 when tool 10 is oriented as illustrated in FIGS. 2 and 3 with a forward most point defined by vertical front surface 48. The rearward most point of first arm 12 may then be defined by an imaginary plane X which may bisect tool 10 along a line defined by first vertical inner surface 36. Accordingly, first arm 12 may have a width W2 that is less than the overall width W1 of tool 10. According to one embodiment, width W2 of first arm 12 may be sized to place vertical front surface 48 at or near the midline of the edge of a sheet of plywood (when used as shown in FIGS. 8 and 9 as discussed below). For example, a sheet of plywood may have a thickness of approximately 1 inch, therefore, width W2 of first arm 12 may be approximately ½ inch. It will be understood that first arm 12 may be provided with a different width W2 as desired.

First arm 12 may then be defined as the forward portion of tool 10 and may include all of third horizontal inner surface 46, vertical front surface 48, first angled top surface 50, second horizontal top surface 52, vertical top surface 54, second angled top surface 56, and third horizontal top surface 58. First arm 12 may also include a portion of second horizontal inner surface 42, as well as a portion of curved recess 60.

First angled top surface 50 and/or second horizontal top surface 52 of first arm 12 may have measurement markings engraved, printed, or otherwise adorned thereon. According to one aspect, as illustrated in FIG. 1A (measurement markings have been omitted from all remaining figures, apart from FIG. 1B (discussed below) solely for the purpose of clarity in the figures, and the omission thereof should not be viewed as a limitation thereon), markings on first angled top surface 50 and/or second horizontal top surface 52 may be standard measurement markings and may run numerically in ascending order from first end 18 to second end 20 of tool 10. According to another aspect, measurement markings may be metric markings and ascend numerically from first end 18 to second end 20 of tool 10. As previously discussed herein, tool 10 may have any specific length L as desired. It will be therefore understood that the measurement markings illustrated in FIGS. 1A and 1B are representative examples and are not intended to be limiting as the actual markings on tool 10 would correspond to the specific length L chosen for the desired implementation. For example, a tool 10 with a specific length L of 12 inches may have the markings shown in FIGS. 1A and 1B while a tool 10 with a specific length L of 24 inches may have appropriate markings across the entire specific length L.

Second arm 14 may extend downwardly from central portion 16 when tool 10 is oriented as shown in FIGS. 2 and 3 and may extend from a lowermost point defined by horizontal bottom surface 34 to an uppermost point defined by an imaginary plane Y which may bisect tool 10 along a line defined by third horizontal inner surface 46. Second arm 14 may therefore have a height H2 that is less than the overall height H1 of tool 10. According to one embodiment, height H2 of second arm 14 may be sized to place horizontal bottom surface 34 at or near the midline of a sheet of plywood. For example, a sheet of plywood may have a thickness of approximately ½ inch, therefore, height H2 of second arm 14 may be approximately ½ inch. It will be understood that second arm 14 may be provided with a different height H2 as desired.

Second arm 14 may include all of horizontal rear surface 28, second vertical rear surface 30, second angled rear surface 32, horizontal bottom surface 34, first vertical inner surface 36, and first horizontal inner surface 38, as well as a portion of first angled rear surface 26 and second vertical inner surface 40.

As with the width W1 and height H1 of tool 10, the width W2 of first arm 12 may be greater than the height H2 of second arm 14. According to one aspect, the ratio between width W2 of first arm 12 and height H2 of second arm 14 may have a ratio of approximately 2:1. According to another aspect, this ratio may be approximately 1.5:1.

Second vertical rear surface 30 and/or second angled rear surface 32 of second arm 14 may have measurement markings engraved, printed, or otherwise adorned thereon. According to one aspect, as illustrated in FIG. 1B, markings on second vertical rear surface 30 and/or second angled rear surface 32 may be standard measurement markings and may run numerically in descending order from first end 18 to second end 20 of tool 10. According to this aspect, the markings may run numerically in the opposite direction from the markings on first angled top surface 50 and/or second horizontal top surface 52 for the purpose of measuring from opposite ends of a piece of stock, as discussed further herein. According to another aspect, measurement markings may be metric markings and descend numerically from first end 18 to second end 20 of tool 10.

First arm 12 and second arm 14 may be oriented perpendicularly or nearly perpendicularly to each other such that angle A between first arm 12 and second arm 14 may be approximately 90°. According to one aspect, angle A may be slightly less than 90° to aid in use of tool 10 and measurements made therefrom as discussed further below. According to another aspect, angle A may be approximately 89°.

Central portion 16 may then extend from first horizontal top surface 22 on a top side of tool 10 as oriented in FIGS. 2 and 3 to plane Y on a bottom most end and horizontally from first vertical rear surface 24 on the front side of tool 10 to plane X on the rear side. Central portion 16 may include all of first horizontal top surface 22 and first vertical rear surface 24, as well as a portion of first angled rear surface 26 and curved recess 60.

Curved recess 60 may have a radius R. Radius R is indicated in FIG. 3 but is shown only as a tangent distance from a tangent plane extending between the first end of first horizontal top surface 22 and the second end of third horizontal top surface 58, to the bottommost point of curved recess 60. It will be understood that radius R may extend to the center point of a circle (not pictured) that follows the contour of curved recess 60. According to one aspect, the length radius R may be greater than the height H2 of second arm 14 but less than the width W2 of first arm 12. According to another aspect, radius R may be any suitable length to impart the desired dimensions to curved recess 60.

With continued reference to FIG. 3, the specific placement and configuration of the various surfaces and faces of tool 10 may provide tool 10 with varying relative thicknesses between surfaces. These thicknesses may include a first thickness T1 which may be defined as the distance from third horizontal top surface 58 to third horizontal inner surface 46. First thickness T1 may also represent the distance from first horizontal top surface 22 to plane Y and may thus further define the maximum height of central portion 16. A second thickness T2 may be defined as the thickness from the forward most edge of second angled top surface 56 where it meets vertical top surface 54 to third horizontal inner surface 46. Second thickness T2 may be less than first thickness T1. A third thickness T3 may be defined as the distance from second horizontal top surface 52 to third horizontal inner surface 46 and may be less than second thickness T2. The fourth thickness T4 may be defined as the height of vertical front surface 48 extending from its first end where it meets third horizontal inner surface 46 to its upper end where it transitions to first angled top surface 50. Fourth thickness T4 may be less than third thickness T3.

A fifth thickness T5 may be defined as the distance from first vertical rear surface 24 to first vertical inner surface 36. Fifth thickness T5 may also represent the distance from first vertical rear surface 24 to plane X and may thus further define the maximum width of central portion 16. A sixth thickness T6 may be defined from the innermost point of first angled rear surface 26 to first vertical inner surface 36. Sixth thickness T6 may be less than fifth thickness T5. A seventh thickness T7 may be defined as the distance from second vertical rear surface 30 to first vertical inner surface 36 and may be less than sixth thickness T6. An eighth thickness T8 may be defined as the entire width of horizontal bottom surface 34 extending from its first end where it meets second angled rear surface 32 to its second end where it meets first vertical inner surface 36. Eighth thickness T8 may be less than seventh thickness T7.

A ninth thickness T9 may be defined as the distance from the bottom of curved recess 60 to third horizontal inner surface 46. Ninth thickness T9 may be less than first thickness T1. A tenth thickness T10 may be defined as the distance from the bottom of curved recess 60 to second horizontal inner surface 42 and may be less than ninth thickness T9. Eleventh thickness T11 may be defined as the distance from second vertical rear surface 30 to second vertical inner surface 40 and may be less than seventh thickness T7.

Figure 10:
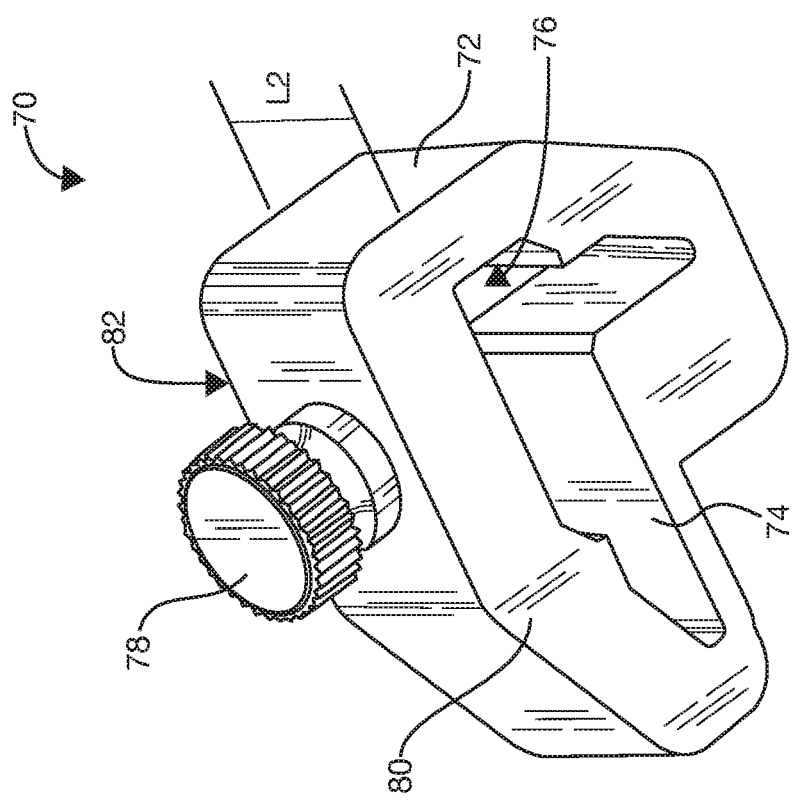
FIG. 10 is a top left perspective view of a stop member for the layout and measurement tool according to one aspect of the present disclosure.
Figure 11:
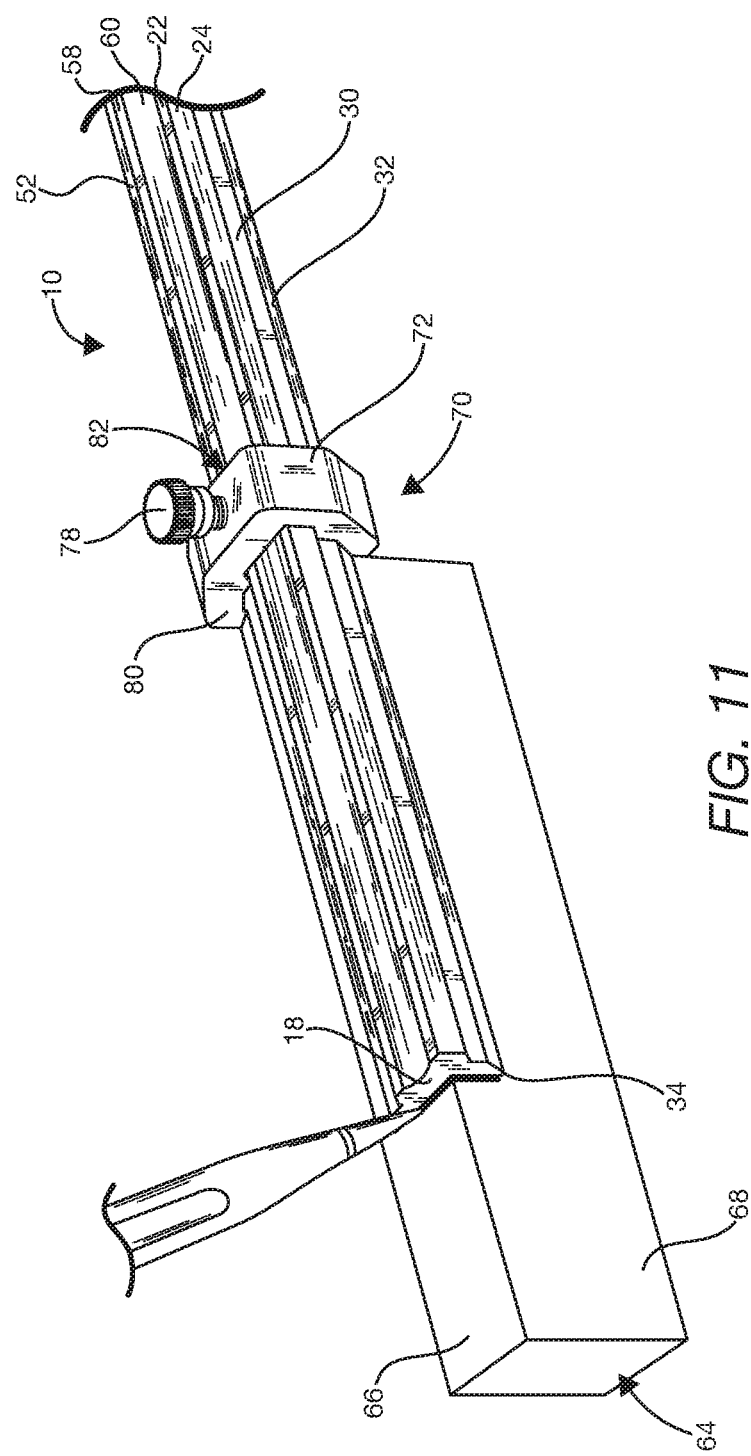
FIG. 11 is a top left rear perspective operational view of a layout and measurement tool and stop member according to one aspect of the present disclosure.

With reference to FIGS. 10 and 11, tool 10 may further include an optional stop member 70 which may be removably and slidably installed thereon. Stop member 70, as best seen in FIG. 10, may include an exterior surface 72 and an interior surface 74 which may each be continuous surfaces in that together stop member 70 forms a ring-like structure that may surround tool 10. Specifically, stop member further defines an aperture 76 that may be shaped to slidably accept tool 10 therein, as best seen in FIG. 11. Stop member 70 may further include a threaded thumbscrew 78 or the like that engages a threaded hole (not explicitly shown in FIGS. 10 and 11, but understood to be present as shown engaged with thumbscrew 78 inserted therein) defined through a portion of the stop member 70 to further engage tool 10. Specifically, thumbscrew 78 may extend through the threaded hole and at least partially into the interior of aperture to engage curved surface 60 of tool 10, as discussed herein.

According to another aspect, stop member 70 may engage tool 10 through use of an alternative connection, other than threaded thumbscrew 78. For example, stop member 70 may engage tool 10 through a clamp, a magnetic connector, an adhesive, or any other mechanical, chemical, non-mechanical, and/or non-chemical connector.

Stop member 70 may further include a first side 80 spaced apart from a second side 82 and defining therebetween a length of stop member 70 which is shown in FIG. 10 as length L2. First side 80 of stop member 70 may be oriented towards first end 18 of tool 10, when installed thereon. Similarly, second side 82 of stop member 70 may be oriented towards second end 20 of tool 10 when installed thereon. Length L2 of stop member 70 may therefore be less than the overall length L of tool 10. According to one aspect, length L2 of stop member 10 may be less than or equal to one inch. According to another aspect, length L2 of stop member 10 may be approximately one half inch.

Stop member 70 may be formed of any suitable material, including, but not limited to, plastic, metal, resin, or the like and may be formed through any suitable manufacturing process or processes.

According to one aspect, stop member 70 may be any suitable structure that may be adapted to permit repeatable measurements to be taken using tool 10, as discussed further below. By way of non-limiting examples, stop member 70 may be, or further include, one or more clamps, clips, bars, vices, or the like.

According to one aspect, the stop member 70 may be placed on tool 10 when they are not in use. This arrangement may provide that the stop member 70 and tool 10 may be stored together to prevent loss or misplacement of either component. Further according to this aspect, stop member 70 may allow tool 10 to be hung from a hook, rack, or other similar device to further provide storage for tool 10 and stop member 70.

Having thus described tool 10 and the various surfaces, components, and dimensions thereof, a method of use therefor will now be described.

Figure 6:
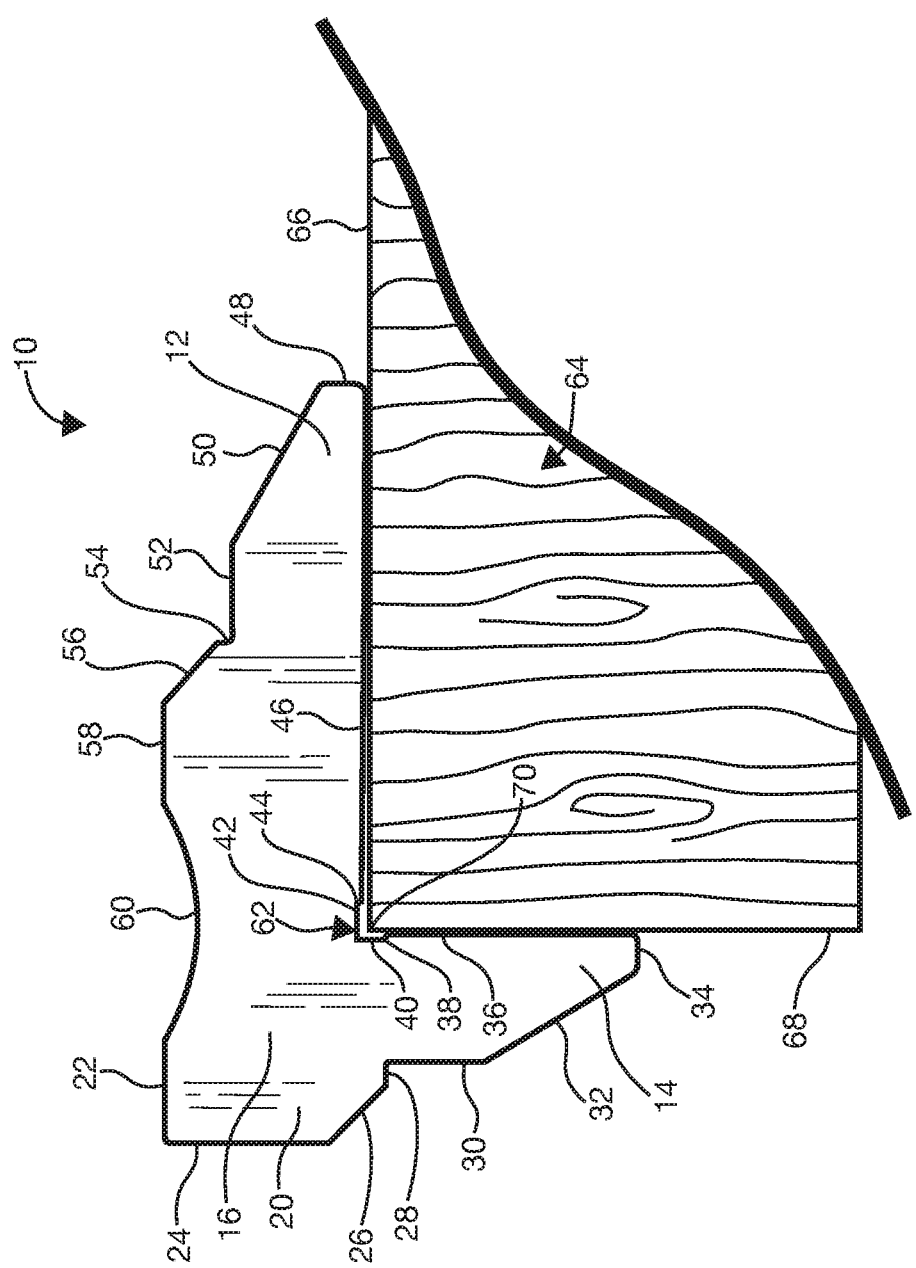
FIG. 6 is a left side elevation and operational view of a layout and measurement tool according to one aspect of the present disclosure.
Figure 7:
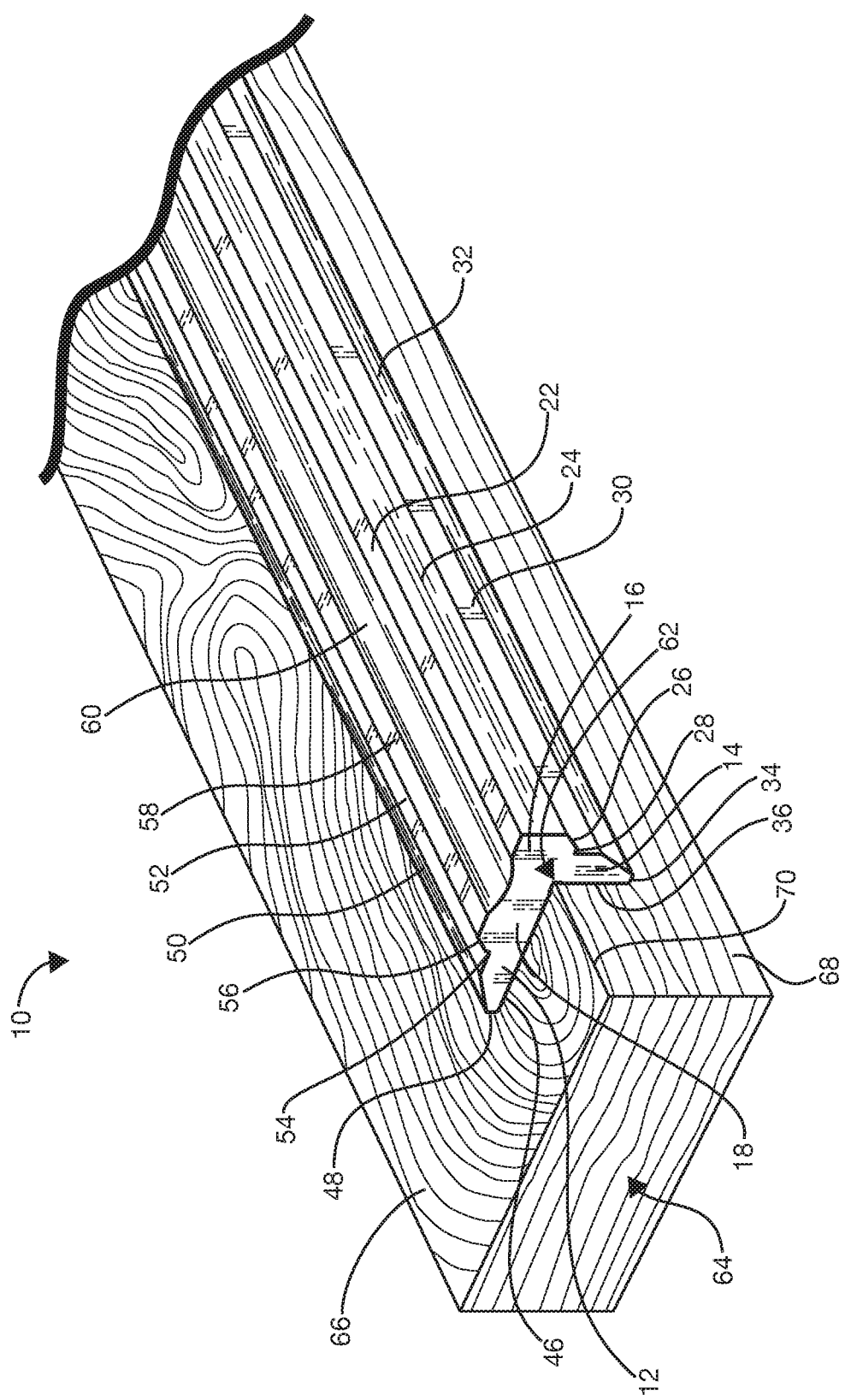
FIG. 7 is a top left rear perspective operational view of a layout and measurement tool according to one aspect of the present disclosure.

With reference to FIGS. 6 and 7, tool 10 may be placed on a piece of stock material generally referenced as stock material 64. It will be understood that stock material 64 may be any material which may be desired to be measured and/or marked according to the methods and disclosure herein. According to one aspect, stock material 64 may be a piece of wood of any dimension. According to another aspect, stock material 64 may be metal, plastic, drywall, or any other material.

The stock material 64 may have a front face 66 and a side face 68 which may meet along an edge or corner 70. Front face 66 may be a major face of stock material 64 in that it may be face of stock material 64 with the greatest overall surface area. Side face 68 may be a minor surface of the stock material 64 in that it may be a face of stock material 64 with a lesser overall surface area. According to one non-limiting example, stock material 64 may be an unaltered sheet of plywood with a front face, a rear face, and four edges. According to this example, the plywood may have two major faces (front and rear) and four minor faces (each of the four edges). According to another example, a standard and unaltered 2×4 would have two major surfaces (the front and back) and four minor surfaces (two sides and two end surfaces). When stock material 64 has equal dimensions, (e.g. a standard and unaltered 4×4) it may have four major faces (all four sides) and two minor faces (the two ends). It will be understood that tool 10 may be utilized with stock material 64 having any dimensions, including equal dimensions, without deviation from the scope herein. It will be further understood that references herein to a minor side face may then explicitly include side faces with equal dimensions to a related major face within the scope thereof.

Tool 10 may then be placed upon the corner 70 of stock material 64 such that third horizontal inner surface 46 of first arm 12 may engage a major front face 66 of stock material 64 while the first vertical inner surface 36 of second arm 14 may simultaneously engage a minor side face 68 of stock material 64. In this position, longitudinal groove 62 may sit along corner 70 of stock material 64, as best seen in FIG. 6. When thusly engaged with stock material 64, the angle A between first arm 12 and second arm 14 insures that first vertical inner surface 36 and third horizontal inner surface 46 remain engaged with front face 66 and side face 68. Particularly, angle A having a reduced relative angle of approximately 89° may provide that the forward most portion of third horizontal inner surface 46 and the bottommost portion of first vertical inner surface 36 remain engaged, thus, keeping tool 10 tight against both faces 66, 68 and the corner 70 of stock material 64.

Groove 62 may provide a slight separation between tool 10 and the corner 70 of stock material 64 to account for minor variations or imperfections therein. Specifically, splinters, burls, nicks, or other minor flaws in stock material 64 may cause an uneven surface along the length of corner 70 which could affect a measurement being taken thereon by causing a portion of a measuring tool without a groove 62 to be misaligned. Accordingly, the inclusion of longitudinal groove 62 allows for minor imperfections in the corner 70 of stock material 64 to extend into the space created by groove 62 thereby allowing tool 10 to remain flush across front and side faces 66, 68 and further avoiding any measurement error caused therefrom.

The configuration of the various faces of tool 10 further insures that measurement markings are directly adjacent to the outermost surfaces of tool 10 thereby putting them in close proximity with stock material 64. Specifically, the location of first angled top surface 50, second horizontal top surface 52, second vertical rear surface 30 and second angled rear surface 32 along with the tapering or angling of second angled rear surface 32 and first angled top surface 50 reduces the distance between stock material 64 and the measurement markings thereon. This configuration may serve to reduce parallax error by providing a secure placement and close proximity to stock material 64 for accurate marking.

Having placed the tool 10, the craftsman may now measure and mark a first distance on front face 66 and measure and/or mark a second distance on side face 68 of stock material 64 without the need to move or adjust the positioning of tool 10. According to one aspect, the first and second distances may be the same distance from a common point. For example, the first and second distances may be measured from the end of a piece of stock material 64. According to another aspect, the first and second distances may be measured at any point along the length of the stock material 64.

Having measurement markings, as described herein, that run in ascending order from first end 18 to second end 20 along first arm 12 while running in descending order from first end 18 to second end 20 along second arm 14 may allow for accurate measurements taken from either end of stock material 64. For example, first end 18 may be aligned with a first end of stock material 64 and measurements may be taken along first arm 12 counting upwards therefrom. Subsequently, second end 20 may be aligned with a second end of stock material 64 and a measurement may be taken by ascending from second end 20 towards first end 18 along second arm 14.

When oriented with first arm 12 across a front face 66 of stock material 64, curved recess 60 is thereby oriented in an upwards direction, as shown in FIGS. 6 and 7. This may allow curved recess 60 to serve as a resting point or tray for a writing utensil, such as a pen, marker, pencil, or the like.

With reference now to FIGS. 8 and 9, tool 10 may be placed along a stock material 64 with second arm 14 extending across and engaged with a major front face 66 while first arm 12 extends across and engages a minor side face 68 of stock material 64. This orientation may be useful for thicker stock material 64 and may allow a craftsman to mark the midline or close to a midline along the side face 68 of stock material 64. In this orientation, tool 10 may operate substantially identically as when oriented and discussed with reference to FIGS. 6 and 7 with the main difference being the distance which first arm 12 and second arm 14 extend across front face 66 and side face 68 of stock material 64, respectfully.

With reference to FIGS. 10 and 11, when tool 10 is equipped with optional stop member 70, tool 10 may be placed along the stock material 64 such that the stop member 70 may engage the end of the stock material 64 thus allowing tool 10 to extend along a face (e.g. front face 66 and/or side face 68) of the material a pre-measured distance. Having stop member 70 set at the pre-measured distance can allow multiple pieces of stock material 64 to be precisely measured in rapid succession and in identical increments.

Stop member 70 may be installed on tool 10 by first rotating thumbscrew counterclockwise to back thumbscrew 78 out of, or partially out of, the threaded hole to provide clearance to allow tool 10 to be slidably inserted into aperture 76. Specifically, either of first end 18 or second end 20 of tool 10 may be slidably inserted into aperture 76 from either first or second side 80, 82 of stop member 70. Stop member 70 may then slidably engage tool 10 to allow stop member 70 to be placed at any position along the length L of tool 10. Alternatively, stop member 70 may be configured to be installed over the body of tool 10. If measurements on a piece of stock material 64 are desired to be taken from first end 18 of tool 10, stop member 70 may be aligned at a pre-determined measurement from first end 18 of tool 10 such that first side 80 of stop member 70 is aligned with the desired measurement markings on tool 10. Similarly, if measurements on a piece of stock material 64 are anticipated to be taken from second end 20 of tool 10, stop member 70 may be aligned at a pre-determined measurement from second end 20 of tool 10 such that second side 82 of stop member 70 is aligned with the desired measurement markings on tool 10. Once aligned as desired, thumbscrew 78 may be rotated clockwise to engage the curved recess 60 of tool 10, thereby securing stop member 70 into the desired position.

According to one aspect, where stop member 70 may a connector other than thumbscrew 78, for example, a clamp, stop member 70 may be installed on tool 10 in a similar manner as before, but with clamp being opened to allow stop member 70 to be slid to any position along the length L of tool 10 before engaging the clamp with tool 10 to secure stop member 70 in the desired position. Other connectors may be used similarly in that stop member 70 may be slid into the desired position and then secured in place with the appropriate connector.

A user may then abut the appropriate face (e.g. first side 80 if measuring from first end 18) against the end of a piece of stock material 64, thus allowing tool 10 to extend the pre-determined distance across the front and/or side face 66, 68 of stock material 64, as best seen in FIG. 11. The user may then mark the desired face(s) 66, 68 of stock material 64, then may move to another piece (or another end of the same piece) of stock material 64 and may repeat an identical marking without having to adjust the stop member 70 or visualize the desired measurement. Stop member 70 may therefore allow precise and repeatable measurements on multiple pieces (or multiple surfaces of a single piece) of stock material 64.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A layout and measuring tool comprising:
   a first arm extending from a central portion in a first direction, the first arm having an inner face for engaging a first surface of a stock material and at least one outer face spaced apart from the inner face and having measurement markings thereon;
   a second arm extending from the central portion in a second direction, the second arm having an inner face for engaging a second surface of the stock material that is perpendicular to the first surface and at least one outer face spaced apart from the inner face and having measurement markings thereon;
   a first end and a second end;
   a length of the tool measured from the first end to the second end;
   an arcuate channel formed in the outer face of the first arm extending along the length of the tool from the first end to the second end;
   a width of the tool measured from the at least one outer surface of the second arm to a terminal end of the first arm;

a height of the tool measured from the at least one outer surface of the first arm to a terminal end of the second arm; and wherein the length is greater than width and is greater than the height, and wherein the width is greater than the height.

2. The tool of claim 1 wherein the first and second arms extend across the longitudinal length of the tool.

3. The tool of claim 1 wherein the first and second arms are oriented at an angle of less than 90 degrees relative to each other.

4. The tool of claim 3 wherein the first and second arms are oriented at an angle of approximately 89 degrees relative to each other.

5. The tool of claim 1 further comprising:
a stop member engaged with the tool along the length thereof and further adapted to engage the arcuate channel with a connector.

6. The tool of claim 1 wherein the width of the first arm is at least one and one half times the height of the second arm.

7. The tool of claim 6 wherein the width of the first arm is twice the height of the second arm.

8. The tool of claim 1 wherein the first arm has two or more outer faces spaced apart from the inner face and each of the two or more outer faces have measurement markings thereon.

9. The tool of claim 1 wherein the second arm has two or more outer faces spaced apart from the inner face and each of the two or more outer faces have measurement markings thereon.

10. The tool of claim 1 wherein the first arm and the second arm each have two or more outer faces spaced apart from their respective inner faces, and each of the two or more outer faces have measurement markings thereon.

11. The tool of claim 1 further comprising:
a corner at uppermost and rearward most point of the central portion, wherein the corner is approximately 135 degrees from each of the inner surface of the first and second arms.

12. The tool of claim 1 further comprising:
a longitudinal groove at the vertex between the inner surface of the first arm and the inner surface of the second arm, the longitudinal groove operable to receive an edge of the stock material.

13. A method comprising:
placing a measurement tool on an edge of a piece of stock material, the measurement tool having a first arm extending a first distance from a central portion of the measurement tool in a first direction, a second arm extending a second distance from the central portion of the measurement tool in a second direction, a first end and a second end defining a longitudinal length of the measurement tool therebetween, and an arcuate channel formed in an outer face of the first arm extending along the length of the tool from the first end to the second end; wherein the first distance is greater than the second distance, and wherein the length of the measurement tool is greater than the first and second distances;

aligning the measurement tool such that the longitudinal length of the measurement tool extends along the edge of a piece of stock material while an inner face of the first arm engages a first surface of the stock material and an inner face of the second arm simultaneously engages a second surface of the stock material that is perpendicular from the first surface of the stock material;

measuring and marking a first distance along the longitudinal length of the measurement tool on the first surface of the stock material; and measuring and marking a second distance along the longitudinal length of the measurement tool on the second surface of the stock material without moving the measuring tool.

14. The method of claim 13 wherein the first and second distances are measured from an end of the stock material.

15. The method of claim 14 wherein the first and second distances are the same distance from the end of the stock material.

16. The method of claim 13 further comprising:
measuring and marking a plurality of distances on the first surface of the stock material, the second surface of the stock material, or the first and second surfaces of the stock material.

17. The method of claim 13 wherein the measurement tool further comprises:
a longitudinal groove at the vertex between the first arm and the second arm, the longitudinal groove operable to receive an edge of the stock material.

18. The method of claim 13 further comprising:
installing a stop member on the measuring tool;
sliding the stop member into a desired position along the length of the measuring tool; and
securing the stop member in the desired position with a connector.

19. The method of claim 13 wherein the first and second arms are oriented at an angle of less than 90 degrees relative to each other.

20. The method of claim 13 wherein the first and second arms are oriented at an angle of approximately 89 degrees relative to each other.

* * * * *